United States Patent [19]

Schiff

[11] Patent Number: 4,577,316
[45] Date of Patent: Mar. 18, 1986

[54] SYNCHRONIZATION SYSTEM FOR A REGENERATIVE SUBTRANSPONDER SATELLITE COMMUNICATION SYSTEM

[75] Inventor: Leonard N. Schiff, Lawrenceville, N.J.

[73] Assignee: RCA Corporation, Princeton, N.J.

[21] Appl. No.: 579,608

[22] Filed: Feb. 13, 1984

[51] Int. Cl.[4] ............................................. H04J 3/06
[52] U.S. Cl. ................................................... 370/104
[58] Field of Search .......................... 370/104; 455/12; 375/118

[56] References Cited

U.S. PATENT DOCUMENTS

| | | | |
|---|---|---|---|
| 3,611,435 | 10/1971 | Cooper | 375/118 |
| 3,787,634 | 1/1974 | Haberle et al. | 370/104 |
| 3,796,868 | 3/1974 | Kaul et al. | 370/104 |
| 3,824,340 | 7/1974 | Sensney | 375/118 |
| 3,835,253 | 9/1974 | Bond | 375/118 |
| 4,001,690 | 1/1977 | Mack et al. | 325/4 |
| 4,010,420 | 3/1977 | Reiner et al. | 325/4 |
| 4,017,684 | 4/1977 | Kurihara et al. | 178/69.1 |
| 4,021,609 | 5/1977 | Oyama et al. | 375/118 |
| 4,052,670 | 10/1977 | Watanabe et al. | 375/118 |
| 4,105,973 | 8/1978 | Arnold et al. | 325/4 |
| 4,107,608 | 8/1978 | Saburi | 370/104 |
| 4,112,498 | 9/1978 | Reiner et al. | 364/728 |
| 4,147,894 | 4/1979 | Watanabe et al. | 179/15 A |
| 4,215,348 | 7/1980 | Cordaro et al. | 370/97 |
| 4,262,356 | 4/1981 | Lautier et al. | 370/104 |
| 4,287,588 | 9/1981 | Segner | 370/104 |
| 4,322,845 | 3/1982 | Fennel, Jr. et al. | 370/104 |

FOREIGN PATENT DOCUMENTS 0004887 10/1979 European Pat. Off. .

Primary Examiner—Douglas W. Olms
Assistant Examiner—Kenneth I. Rokoff
Attorney, Agent, or Firm—Joseph S. Tripoli; George E. Haas

[57] ABSTRACT

A satellite communications system has a number of earth stations sharing an uplink carrier in a time division multiple access mode. One of the earth stations is designated as the master station for the carrier. The uplink transmissions from each station are synchronized by computing the time interval between the arrival at the satellite of the signal from the master station and the signal arrival from each of the other stations. The actual time intervals are compared to the optimum intervals for a properly synchronized transmission from each station. If the comparison indicates that a given earth station is not properly synchronized, that station's time of transmission is adjusted until the actual interval substantially matches the optimum interval.

13 Claims, 6 Drawing Figures

SYNCHRONIZATION SYSTEM FOR A REGENERATIVE SUBTRANSPONDER SATELLITE COMMUNICATION SYSTEM

This invention relates to time division multiple access communication systems, and more particularly, to the synchronization of the various transmitting stations using such a communication system.

BACKGROUND OF THE INVENTION

In a conventional time division multiple access (TDMA) communication system, such as a communication satellite relay link, a number of transmitting stations share a common carrier in a time division multiplex mode. The information is transmitted to the satellite in reoccuring increments of time commonly referred to as frames. Each frame is divided into subframe intervals, one for each of the earth stations transmitting on that carrier (See FIG. 1). Each earth station in turn transmits a burst of information during its subframe interval.

The satellite receives the information transmitted on each carrier, converts it to a downlink frequency which is transmitted back to earth as an echo of the uplink signal. The earth stations then receive this signal and divide it into frames and subframes to extract the information transmitted by each of the earth stations.

The time at which each earth station transmits its information is very critical so that its transmission does not overlap or interfere with the signals from the earth stations transmitting during adjacent subframes. The synchronization of the earth station signals is complicated by the difference in transmission distances to and from the satellite, clock instabilities at each station, and the orbital drift of the satellite. In a conventional TDMA communication system each of the transmitting earth stations receives the downlink signal and from that signal uses the timing relationships between its signal and the adjacent ones to determine whether its transmission is properly timed with respect to the adjacent subframes.

An alternative communication system has been proposed in which a number of uplink carriers are transmitted in a conventional TDMA mode. The satellite then time division multiplexes these various uplink channels into a single downlink channel. For example, the uplink channel could have a 72 MHz bandwidth which would permit six frequency division multiplexed carriers each having a ten Megabit data rate. Each individual carrier is in turn shared by a number of transmitting earth stations in a time division multiple access mode. With TDMA, the actual transmission on each carrier consists of a burst of data at a ten megabit rate from one earth station followed by some guard time, then followed by a second burst from a second transmitting earth station and so on until all of the participating earth stations sharing the uplink carrier have bursted their information. This would complete one transmission frame and another frame would then begin repeating the cycle.

At the satellite each of the six carriers is received and demodulated to extract the transmitted information. The information from each of the six carriers is stored temporarily in separate buffers. Data from each of the six uplink carriers is then time division multiplexed onto a single carrier at a higher data rate (e.g. 60 Megabits). This higher rate is equal to the sum total of the uplink data rates from the six individual carriers. During the transmission of the downlink signal each buffer sequentially empties its contents into the downlink signal in a conventional time division multiplex (TDM) transmission scheme.

In this type of regenerative subtransponder satellite communications system, the individual transmitting earth stations no longer receive a signal from the satellite which can be used to synchronize and time its transmission. This regenerative system has converted each of the six individual uplink carriers into a single high speed downlink carrier in which the individual timing relationships for the various uplink signals have been lost. In this system the downlink is completely divorced from the uplink because the individual data streams transmitted to the satellite are demodulated on board the satellite and the data is packed into buffers. Hence, the normal TDMA synchronization cannot be used.

BRIEF DESCRIPTION OF THE INVENTION

One of the earth stations is designated as a master station which is the first to transmit its information to the satellite during each transmission frame period. The time of arrival at the satellite of each station's transmission is recorded. This time of arrival information is transmitted back to earth on the downlink signal, along with the information transmitted from each earth station. Each earth station then is able to receive the downlink transmission and compute the interval of time between the arrival of its transmission and that of the master station. This interval then is compared to the optimum interval for a properly synchronized transmission. If the actual time of arrival interval differs from the optimum interval, the timing of the earth station's transmission may be adjusted so as to provide an optimally timed transmission with respect to the other earth stations.

DETAILED DESCRIPTION OF THE PREFERRED EMBODIMENTS

In the present regenerative satellite communication system a number of separate carriers, M, are used to transmit data, such as digital information, up to the satellite. By way of an example, a given transponder on the satellite may have a bandwidth of 72 MHz. This permits six individual carriers (M=6) to be frequency division multiplexed on that transponder such that each carrier can have a data transmission rate of 10 Megabits. Each individual data carrier is in turn shared by a series of transmitting earth stations in a conventional time division multiple access mode. The number of earth stations sharing each carrier may vary, although all carriers should preferably have the same data rate.

Figure 1:
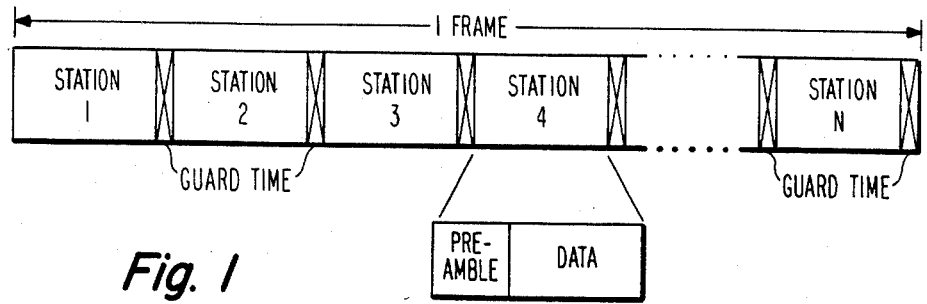
FIG. 1 represents one transmission frame in the TDMA uplink signal for a regenerative subtransponder satellite communications system.

With reference to FIG. 1, a frame of the transmission on one of the M carriers is shown and may be 20 msec long, for example. The frame comprises sequential bursts of data from each of the N earth stations sharing that uplink carrier. The individual bursts of data in the transmission frame are separated by guard times so that the burst from one station does not overlap and interfere with the bursts of data from other earth stations transmitting adjacent in time to the given earth station. As is well known, the individual bursts of data or information from each station typically consists of a preamble which allows for carrier synchronization and station identification. Typically, the preamble is a unique digital word which resembles a long pseudo-noise sequence. After the earth station transmits the preamble, the actual data or information to be communicated is sent on the uplink transmission, as is shown in the lower portion of FIG. 1. The first station to transmit in each time frame is designated as the master station for that uplink carrier. Although with minor modification of the preferred embodiment another earth station could serve as the master station.

Figure 2:
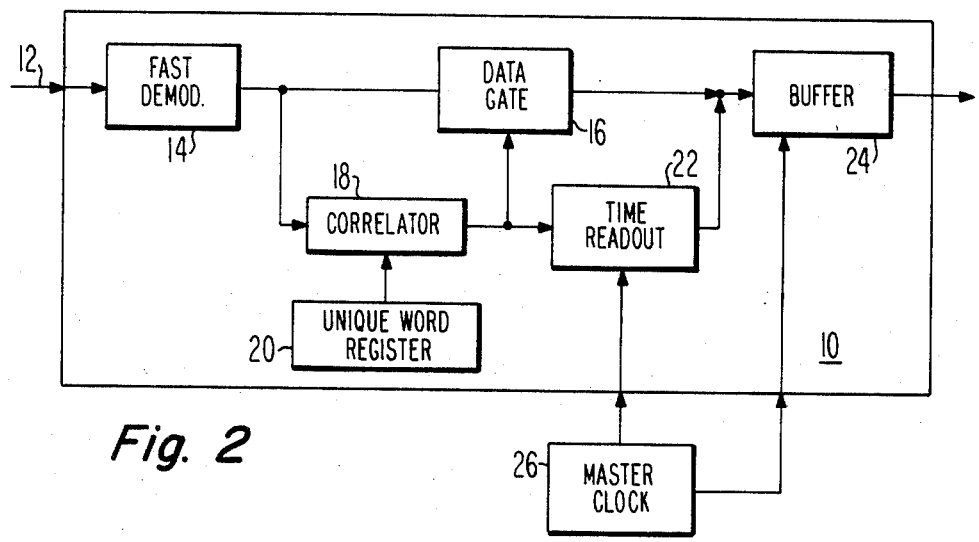
FIG. 2 is a block diagram of the signal processing circuitry in the satellite.

Each uplink carrier signal is received by the satellite and processed by a separate circuit shown in FIG. 2. The signal from one of the uplink carriers is inputed into the signal processor circuit 10 on line 12. The received signal on line 12 may have been converted from a microwave frequency to an IF frequency by a downconverter (not shown). The signal is fed into a fast demodulator 14 which demodulates the signal to derive the baseband frequency or in other words information transmitted by the earth stations sharing that carrier. The output of the demodulator is coupled to a data gate 16 and a cross-correlator 18. The cross-correlator 18 compares the transmitted information with a unique word stored in a register 20. The register 20 contains a series of unique words which correspond to the unique words in the preamble of the transmission from each of the earth stations sharing that carrier. The register 20 supplies the unique words to the cross correlator 18 in the same sequence as the earth stations transmit on the carrier. The cross-correlator detects a cross-correlation or match between the unique word stored in register 20 and the presence of that word in the output from the fast demodulator 14. The match of words indicates the beginning of the transmission subframe for the corresponding earth station.

Upon the detection of this match, the correlator 18 produces a pulse at its output which is fed to the control inputs of both the data gate 16 and a time readout circuit 22. The readout circuit 22 includes a counter for counting pulses from a master clock 26. The clock provides pulses at the data rate of the downlink (e.g. 60 Mbit). The readout counter counts between 1 and $1.2 \times 10^6$ and then automatically resets to begin counting again. The maximum number of the count equals the number of bits in the downlink transmission frame, ie. the data rate of the downlink (60 Mbit) times the frame time (20 msec). The count represents the time of arrival of a station's signal at the satellite in terms of cycles of the master clock 26. Upon receipt of the pulse from correlator 18, the time readout circuit 22 feeds an earth station identification number into a storage buffer 24. Then the readout circuit 22 transmits the time count from the satellite master clock 26 to the storage buffer 24. In a variation of this embodiment, the time counter could be included as part of the master clock 26 rather than the readout circuit 22. A single counter could be used in the satellite rather than a counter for each carrier processor 10. In this variation, the count from the single counter would be fed to the readout circuit 22 in each processor.

After the time has been read into buffer 24, the data gate 16 feeds the output of the fast demodulator 14 into the buffer 24. The data sent through gate 16 represents the information transmitted by the corresponding earth station. At this point, the buffer 24 contains a station identifier, a time count from the master clock which represents the time of arrival at the satellite of the signal from that station, and the data the station sent. The cross-correlator then begins looking for another unique word contained in the preamble transmission from the next station in the uplink transmission frame. The sequence of providing the station identifier, the time of arrival and the data for the next station into buffer 24 is the same as for the previous station. This cycle continues for each of the stations in the uplink frame.

Figure 3:
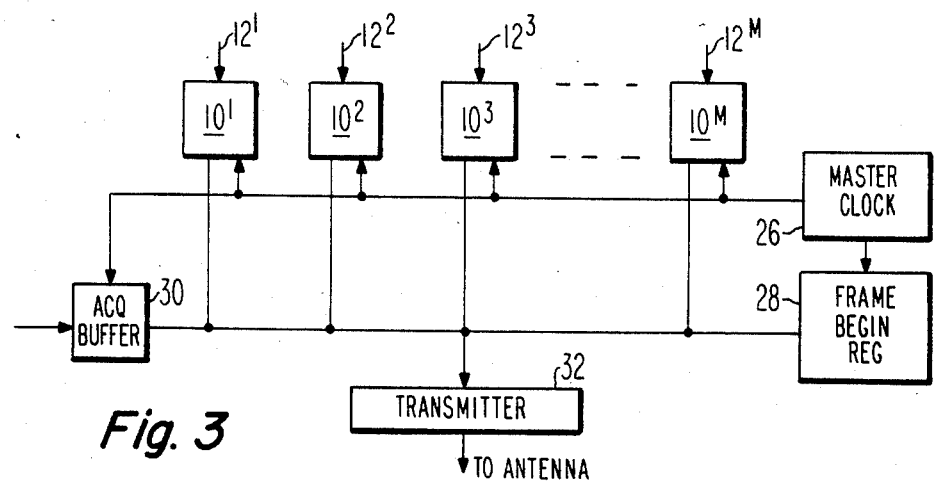
FIG. 3 is a block diagram of the satellite transmitter signal multiplexer.
Figure 4:
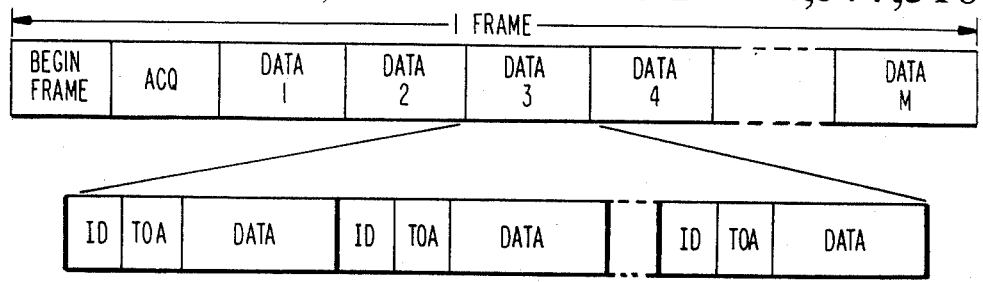
FIG. 4 represents a frame and subframes in the downlink transmission from the satellite.

With reference to FIGS. 3 and 4, after each of the buffers 24 in the signal processing circuits $10^1$ through $10^M$ have stored a frame of data transmitted on the M uplink carriers, the data then can be sequentially read out of each of the buffers and transmitted to earth on a single downlink carrier using a conventional time division multiplex scheme. The downlink communication signal is composed of a plurality of frames of data, one of which is shown in FIG. 4. At the start of the downlink frame is a begin frame signal which is a pseudo-noise digital sequence to allow precision lock up at the receiving earth stations for timing purposes. An acquisition information signal (ACQ), to be described later, is transmitted immediately following the begin frame information. The frame then comprises a series of M data subframe transmissions containing the content of each of the M uplink carrier signals stored in the buffers 24 of the processing circuits $10^1$–$10^M$. One of these subframes is shown in expanded form in the lower portion of FIG. 4. It consists of signals representing the station identification, the time of arrival and the data for each of the N stations transmitting on the respective uplink carrier.

The downlink transmission frame is created using circuitry similar to that shown in FIG. 3. The master clock 26 enables register 28 which contains the begin frame data sequence. This sequence is sent to transmitter 32. The transmitter 32 is coupled to the downlink antenna (not shown). After the begin frame sequence, data from an acquisition buffer 30 is sent to the transmitter 32. Then, the master clock 26 sequentially enables each of the signal processing circuits $10^1$–$10^M$ to output the contents its buffers to the transmitter 32 for transmission to earth. The single line shown connecting the master clock 26 to the processors 10 and the ACQ buffer 30 actually is several lines carring the clock signals described with reference to the circuit of FIG. 2. Once the contents of a buffer have been transmitted, the buffer can begin storing the information contained in the next uplink frame.

Figure 5:
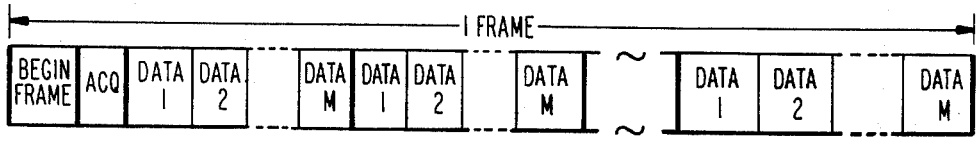
FIG. 5 represents a frame and subframes of the downlink transmission in an alternative embodiment of the instant communication system.

In the aforementioned embodiment of the regenerative subtransponder communications system, each of the buffers 24 for the M uplink carriers must be capable of storing an entire frame of the uplink transmission. It should be noted that to conserve on buffer memory in the satellite, it is possible to use smaller buffers to store portions of the uplink frame, for example the portion of the frame consisting of data from only one station. The downlink frame necessarily would be divided into a greater number of subframes, as shown in FIG. 5. In the case where the uplink buffers 24 store only the transmission from one station, the number of subframes in the downlink signal would be the number of stations (N) times the number of carriers on the uplink (M). The downlink frame would consist of the beginning frame and acquisition portions followed by N cycles of data from each of the M carriers.

It can readily be seen from an analysis of the downlink signal and in particular each frame of that signal, that the transmission synchronization of the various earth stations cannot be derived by receiving the downlink transmission and comparing the position of each stations transmission to that of the earth stations transmitting before and after it, as is conventionally done with TDMA operation. This inability to derive synchronization from the downlink signal is particularly evident in the alternate scheme shown in FIG. 5 and described immediately above. Therefore, an unconventional technique for acquiring the satellite and remaining synchronized with the TDMA uplink transmission scheme must be utilized.

Figure 6:
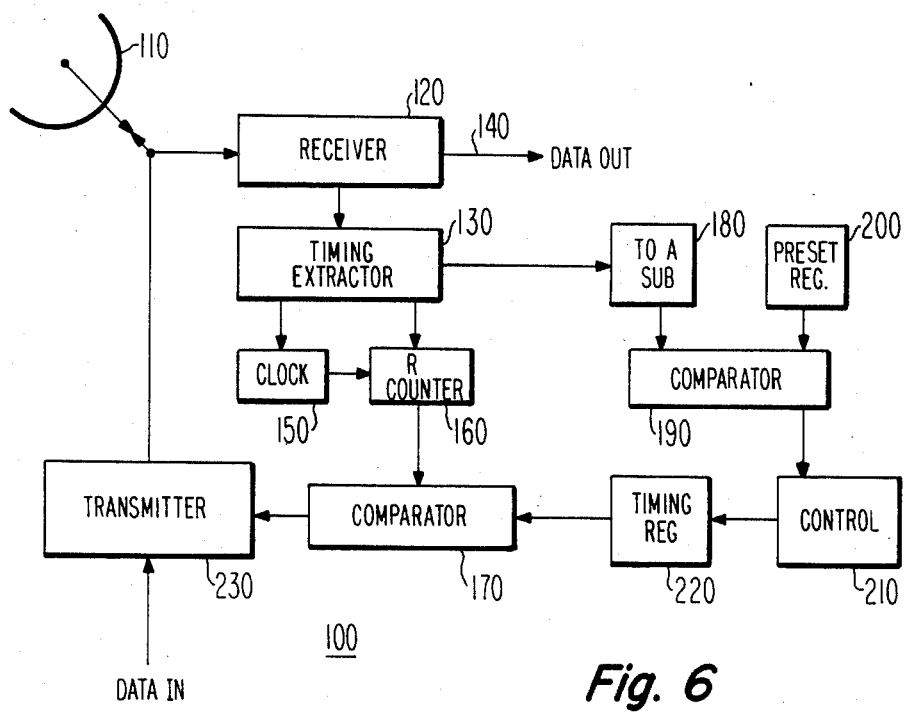
FIG. 6 is a block diagram representing the earth station apparatus for the synchronizing uplink transmissions.

With reference to FIG. 6, an earth station 100 (which is not a master station) has an antenna 110 which serves both as the transmitting and the receiving antenna. The antenna 110 is coupled to a receiver 120 which receives the signal from the satellite and demodulates it to provide a data output signal on line 140 and an input to a timing extractor 130. The timing extractor serves several functions one of which is to synchronize an earth station clock 150 with the master clock on board the satellite. The station clock is set to the downlink data rate, e.g. 60 Megabits. The clock synchronization may be done, for example, by using the beginning of each downlink frame as a timing synchronization signal. The timing extractor 130 also sends a pulse at the beginning of each frame to the reset input of a transmitter control counter 160 which is also coupled to the clock 150 to count the clock pulses. The counter 160 counts between 1 and $1.2 \times 10^6$ cycles of the clock. The output of the counter 160 is connected to one input of a first comparator 170.

The timing extractor 130 is also coupled to a time of arrival subtractor 180 providing the subtractor with information from the downlink signal regarding the time of arrival of the signals from the master station and the earth station 100. The subtractor 180 subtracts the two times of arrival supplied to it to determine the time interval between the arrival of the master earth station signal and the arrival of the signal from the particular earth station 100. This time interval is then supplied as one input to a second comparator 190. The second comparator also receives an input from a preset register 200 which contains a number representing the optimum time interval between the time of arrival of the signals from the master earth station and the ground station 100 for the subframe of the uplink transmission assigned to earth station 100.

The second comparator 190 compares the actual time interval computed by subtractor 180 with the optimum interval stored in preset register 200. The result of that comparison is coupled to a transmitter timing control circuit 210 which controls the transmitter timing register 220. The timing register 220 contains a number determined during the earth station acquisition process (to be described) which represents the number of clock pulses from the time that the begin frame signal is received at the earth station 100 to the instant the earth station 100 transmits its data to the satellite. The timing register 220 is coupled to the other input of the first comparator 170. The comparator 170 is connected to a transmitter 230 to enable the transmitter upon the coincidence of the count from counter 160 and contents of the timing register 220.

The master earth station for each uplink carrier is completely different from the other earth stations using the same carrier. Unlike earth station 100 in FIG. 6, the master station has the output from the timing extractor coupled directly to the transmitter enable input, so that the transmission commences immediately upon receipt of the begin frame signal in the downlink transmission.

As noted previously with respect to the particular example used for descriptive purposes, the uplink channel may have a bandwidth of 72 Megahertz which allows six uplink carriers operating at a 10 megabit rate. One method of satellite acquisition takes advantage of the fact that if quadrature phase shift keying (QPSK) is used to modulate the individual uplink carriers, the entire 72 megahertz bandwidth will not be utilized. Hence, on the uplink channel there is room for an auxiliary frequency channel which may be utilized for acquisition purposes. A single acquisition carrier per transponder is satisfactory since typically ground control of the communications system permits only one earth station to attempt to acquire this satellite at any given time.

Once an earth station has been given permission to acquire and has locked itself onto the satellite, it begins to transmit a long pseudo-noise sequence on the acquisition frequency immediately upon receipt of the begin frame data in the downlink transmission from the satellite. This pseudo-noise sequence is received by the satellite and processed in circuitry similar to that in FIG. 2, except that the correlator and unique word register detect a unique word that is used by all stations only for acquisition purposes. The satellite stores the time of arrival of the pseudo-noise sequence in an acquisition buffer 30 (FIG. 3). The time of arrival of the acquisition signal is transmitted back to earth during the acquisition subframe, ACQ, of the downlink transmission frame (FIGS. 4 and 5 and is repeated with every frame transmission. If no earth station is attempting to acquire the satellite, the acquisition portion of the downlink frame is blank.

When the earth station that is attempting to acquire the satellite starts sending the pseudo-noise sequence, it will initially receive nothing in the acquisition portion of the downlink transmission due to the propagation delay to and from the satellite. After a period of time on the order of a quarter of a second, which represents the roundtrip time up to the satellite and back, a number between 1 and $1.2 \times 10^6$ will appear in the acquisition information subframe of the downlink transmission. The acquiring station also is receiving the time of arrival of the signal from the master station.

Because the acquiring station has been assigned a particular subframe in the uplink transmission, it also knows the optimum time period between the arrival of the master station signal and the signal for that subframe. For example, if the assigned subframe is in the middle of the uplink frame, the clock interval should be 600,000 or half of the $1.2 \times 10^6$ maximum clock cycle. Similarly, if the subframe is one quarter of the way down the frame, the interval should be 300,000 and so forth. The optimum interval is stored in preset register 200 FIG. 6.

Using the time of arrival of the master earth station signal and the time of arrival of the acquisition signal, the acquiring earth station can determine whether its signal is being transmitted at the proper time to be synchronized with the other transmissions in the uplink time frame. The times of arrival are detected by the extractor 130 and sent to subtractor 180. The interval between the two arrivals is computed by subtracting one time from the other. The output of the subtractor 180 is compared by the second comparator 190 to the optimum interval stored in preset register 200.

The acquiring earth station begins to delay the transmission of the acquisition pseudo-noise sequence from the receipt of the begin frame pulse on the downlink signal. This is accomplished by transmitter timing control 210 incrementing the contents of the timing register 220. This delay is increased in multiples of bit time for the 60 megabit clock, until the time interval between the pseudo-noise burst arrival and the arrival of the signal from the master station is substantially the optimum interval for the assigned subframe. At that time, the amount of the transmission delay, which is a number between 1 and $1.2 \times 10^6$ clock cycles, synchronizes the signal transmission not only for the acquisition burst but also for the actual data transmission for the assigned subframe. This delay is then stored in the transmitter timing register 220 and used to time the transmission bursts from the uplink transmitter on the data carrier frequency.

As an alternative to the use of a separate acquisition frequency, a conventional acquisition method may be utilized. The pseudo-noise sequence may be superimposed on the actual data carrier. The acquisition sequence must be at lower amplitude than the data signals in order not to interfere with the data transmissions which it overlaps. Typically the acquisition transmission is 20 dB down from the normal transmission level. The acquisition correlator looks for the acquisition pseudo-noise sequence in the particular uplink carrier assigned to the station. As with the primary acquisition process, the time of transmission of the pseudo-noise sequence is increasing delayed from the receipt of the begin frame signal until the proper time interval is obtained.

Once the earth station 100 has acquired the satellite and it is transmitting bursts of data during each of its assigned subframes, the earth station continuously or periodically monitors the timing of its transmission with respect to the other earth stations transmitting on the same uplink carrier. This is accomplished in a manner similar to the acquisition phase, by receiving the satellite downlink transmission containing all of the signals from the M uplink carriers feeding the demodulated signal to the timing extractor 130. At the start of each downlink transmission frame, the timing extractor 130 resets counter 160 to begin counting pulses from earth station clock 150. The timing extractor 130 also extracts the time of arrival of the signal from the master earth station and inputs that information into subtractor 180. At a later point during the transmission of the downlink information frame, the timing extractor 130 detects the time of arrival of the signal from the earth station 100. This time of arrival is also fed to the subtractor 180. The two times of arrival are subtracted and the difference representing the interval of time between the arrival of the master earth station signal and the signal from earth station 100 is fed to the second comparator 190. The comparator 190 compares the actual time interval between the two signals with the optimum interval for a properly synchronized signal stored in preset register 200. If this comparison indicates that the signals are arriving at the optimum time, no further action is taken by the synchronization circuit. However, if the comparison indicates that the signal is not optimally synchronized, an output from the second comparator 190 tells the transmitter control circuit 210 to alter the time of transmission by the transmitter 230 and in which direction to change the transmission time.

Transmitter 230 transmits the signal on a predetermined time delay from the receipt of the begin frame signal in the downlink transmission. This is accomplished by counter 160 counting cycles of the earth station clock 150 which are synchronized with the master clock on the satellite. The counter 160 is reset upon the receipt of each begin frame signal in the downlink transmission. The first comparitor 170 continuously compares the contents of counter 160 with the contents of the transmitter timing register 220. A pulse is sent to the transmitter 230 which initiates its transmission to the satellite via antenna 110, when a coincidence of values is indicated by comparitor 170. If the transmission of the signal from the earth station 100 is not properly timed the transmitter controller 210 will alter the value in the transmission timing register either upward or downward depending upon the output from the second comparator 190, so as to either increase or decrease the delay in transmission from receipt of the downlink begin frame signal. The altering of the transmission delay continues until the second comparator 190 indicates that the computed or actual difference in the signal arrival times determined by subtractor 180 matches the optimum value for a properly synchronized signal stored in preset register 200.

The system described above can be modified so that the time intervals between arrival of the signal from the master station and the signals from the other stations are computed on board the satellite and transmitted to earth.

With respect to FIG. 2, the counter in the readout circuit 22 can be configured to reset upon receipt of a signal from the correlator 18 indicating the arrival of the signal from the master station. In this embodiment, the readout from circuit 22 into buffer 24 will be the time interval between signal arrivals from a given station and the master station in terms of master clock pulses.

This interval is transmitted to earth in the time of arrival portion of the downlink signal from each earth station. The earth station 100 (FIG. 6) receives the time interval directly from the satellite without having to compute it. Therefore, the time of arrival subtractor 180 is not required and the received time of arrival interval can be fed directly from the timing extractor 130 to the second comparator 190. In all other aspects the system functions the same as the previous embodiment.

Because the present system uses the time of signal arrival to control the uplink transmission, the synchronization is not derived from the timing relationship of the subframes in the downlink signal. Therefore, the instant invention may be used to synchronize the uplink earth stations in a regenerative subtransponder communications system.

I claim:

1. In a satellite communication system having a plurality of earth stations sharing an uplink carrier in a time division multiple access mode wherein one of said earth stations is designated as a master earth station, the method of synchronizing the transmission from each earth station comprising the steps of:

determining the time of arrival at the satellite of the signal from each earth station; and transmitting the time of arrival of the signals at the satellite to the earth stations; and adjusting, if necessary, the time of transmission from at least one earth station so that the determined time of arrival of the signal at the satellite matches the optimum time of arrival for a properly synchronized transmission.

2. The satellite communication synchronization method according to claim 1 wherein the adjusting step includes:

computing the time interval between the time of arrival at the satellite of the signal from the master earth station and the time of arrival at the satellite of the signal from each of the other earth stations sharing the carrier with the master earth station;

comparing the time interval for each earth station with the optimum interval for a properly multiplexed signal; and if the time interval for a given station is not the same as the optimum time interval, adjusting the time of transmission from that earth station to the satellite so that the computed time interval substantially coincides with the optimum time interval.

3. In a satellite communication system having a plurality of earth stations sharing an uplink carrier in a time division multiple access mode wherein one of said earth stations for the uplink is designated as a master earth station, apparatus for synchronizing the signal transmission from each of the earth stations comprising:

means for determining the time of arrival at the satellite of the signals from each of the earth stations; and means for adjusting the time of transmission of the signal from at least one earth station so that the time of the signal arrival at the satellite substantially matches the optimum time of arrival for a properly synchronized transmission from that earth station.

4. The apparatus as in claim 3 wherein the adjusting means comprises:

a subtractor for determining the time interval between the time of arrival of the signal from the master earth station and the time of arrival of the signal from at least the one earth station;

a comparator for comparing the determined time interval with the optimum time interval for a properly synchronized transmission system; and means for controlling the time of transmission from the earth station based on the results of the comparison.

5. The apparatus as in claim 4 wherein the means for controlling the time of transmission includes:

a clock producing regularly timed pulses;

a counter for counting the clock pulses;

means coupled to the counter for initiating the transmission upon the occurence of a given count; and means for changing the given count so that the determined time interval substantially coincides with the optimum time interval.

6. The apparatus as in claim 3 wherein as part of each transmission each earth station transmits a station identifier unique to that station and wherein the means for determining the time of arrival is on the satellite and comprises:

means for receiving the uplink carrier;

means for demodulating the received uplink carrier to produce a signal containing information present on the carrier;

a correlator for detecting the occurrence of each station identifier in the information signal;

means for determining the time at which the correlator detects the occurrence of each stations identifier; and means for storing the information demodulated from the carrier and the time from the determining means.

7. The apparatus as in claim 6 wherein said means for adjusting the time of transmission comprises:

means for determining the interval between the time of arrival of the master earth station signal and time of arrival of the signal from at least the one earth station;

means for comparing the determined interval to the optimum interval for a properly synchronized transmission; and means for controlling the time of the earth station transmission so that the comparisions of the two intervals indicates that they are substantially equal.

8. The apparatus as in claim 7 wherein the interval determining means comprises a subtractor.

9. In a regenerative subtransponder satellite communications system having a plurality of uplink information carriers with a plurality of earth stations sharing each uplink carrier in a time division multiple access mode wherein one of said earth stations for each uplink carrier is designated a master earth station, and said system having a downlink carrier on which the information present on the plurality of uplink carriers is transmitted in a time division multiplex mode; apparatus for synchronizing the signal transmission from each of the earth stations comprising:

means for generating a time count on the satellite;

means for storing the time count upon the arrival at the satellite of the signal from at least one earth station;

means for transmitting the stored counts to the earth stations; and means utilizing the transmitted time count for controlling the time said one earth station transmits to the satellite so that the transmission is properly synchronized with the transmissions from the other earth stations.

10. The system as in claim 9 wherein the means for generating a time count includes a circuit for resetting the count upon the arrival of the signal from the master earth station.

11. The system as in claim 10 wherein the means for controlling includes:

means for comparing the time count to the optimum count for a properly synchronized transmission; and adjusting the time of transmission of the one earth station in response to the comparison of the two counts until the transmitted count is substantially the same as the optimum count.

12. The system as in claim 9 wherein the means for storing the time count also stores the time count upon the arrival at the satellite of the signal from the master earth station.

13. The system as in claim 12 wherein the means for controlling includes:

means for computing the difference between the time count for the master station signal arrival and the time count for said one earth station signal arrival;

means for comparing the computed difference with a value representing the optimum difference for a properly synchronized transmission from said one earth station; and means for adjusting the time of transmission of the one earth station in response to the comparison until the transmitted count is substantially the same as the optimum count.

* * * * *

UNITED STATES PATENT AND TRADEMARK OFFICE
CERTIFICATE OF CORRECTION

PATENT NO. : 4,577,316
DATED : March 18, 1986
INVENTOR(S) : LEONARD NORMAN SCHIFF It is certified that error appears in the above-identified patent and that said Letters Patent is hereby corrected as shown below:

Column 9, line 35, after "means" insert --responsive to said time determining means--.

Signed and Sealed this

Eighth Day of July 1986

[SEAL]

Attest:

Attesting Officer

DONALD J. QUIGG

Commissioner of Patents and Trademarks